US012781291B2

(12) United States Patent
Klosterhalfen et al.

(10) Patent No.: US 12,781,291 B2
(45) Date of Patent: Nov. 3, 2026

(54) METHOD FOR PROCESSING SUGAR BEETS

(71) Applicant: Suiteg GmbH, Cologne (DE)

(72) Inventors: Wolfgang Klosterhalfen, Kerpen-Sindorf (DE); Martin Vesper, Wuppertal (DE)

(73) Assignee: Suiteg GmbH, Cologne (DE)

( * ) Notice: Subject to any disclaimer, the term of this patent is extended or adjusted under 35 U.S.C. 154(b) by 486 days.

(21) Appl. No.: 18/285,894

(22) PCT Filed: Apr. 7, 2022

(86) PCT No.: PCT/EP2022/059252
§ 371 (c)(1),
(2) Date: Oct. 6, 2023

(87) PCT Pub. No.: WO2022/214589
PCT Pub. Date: Oct. 13, 2022

(65) Prior Publication Data
US 2024/0117453 A1 Apr. 11, 2024

(30) Foreign Application Priority Data
Apr. 9, 2021 (EP) .................................... 21167562

(51) Int. Cl.
*C13B 10/08* (2011.01)
*C13B 5/06* (2011.01)

(52) U.S. Cl.
CPC .............. *C13B 10/083* (2013.01); *C13B 5/06* (2013.01)

(58) Field of Classification Search
None
See application file for complete search history.

(56) References Cited

U.S. PATENT DOCUMENTS 962,597 A * 6/1910 Stewart et al. .......... C13B 10/10 127/7
3,477,873 A 11/1969 Koelsch
5,213,836 A * 5/1993 McGillivray .......... A21D 2/366 426/804
6,032,409 A * 3/2000 Obonai .................. A01G 24/44 524/789

FOREIGN PATENT DOCUMENTS

| | | | |
|---|---|---|---|
| CN | 104081995 | A * | 10/2014 |
| DE | 69914480 | T2 | 11/2004 |
| ES | 346047 | A1 | 12/1968 |
| GB | 2156200 | A | 10/1985 |
| WO | 2004/093555 | A1 | 11/2004 |
| WO | 2008/129283 | A1 | 10/2008 |

OTHER PUBLICATIONS

CN-104081995-A, English translation (Year: 2014).*
Chinese examination report dated Aug. 31, 2025, for Chinese Application 2022800212224.
International Search Report and Written Opinion dated Jul. 7, 2023, for Application PCT/EP2022/059252.
International Preliminary Report on Patentability dated Jul. 7, 2023, for Application PCT/EP2022/059252.

* cited by examiner

*Primary Examiner* — Stefanie J Cohen
(74) *Attorney, Agent, or Firm* — The Dobrusin Law Firm, P.C.

(57) ABSTRACT

Method to extract sugar from a sugar beet, the sugar beet is cut in a cutting device in strips/cossettes with a length and a cross-section, the length of the strips/cossettes is, at least essentially, uniform.

20 Claims, 4 Drawing Sheets

METHOD FOR PROCESSING SUGAR BEETS

CROSS-REFERENCE TO RELATED APPLICATIONS

This application is a US National Stage Entry of PCT/EP2022/059252 filed on Apr. 7, 2022, which claims priority to EP 21167562.4 filed on Apr. 9, 2021.

FIELD

The present invention relates to a method to extract sugar from a sugar beet, wherein the sugar beet is cut in a cutting device in strips/cossettes. Each strip/cossette has a structure with a length and a cross-section.

BACKGROUND

Sugar extraction from sugar beets is a time- and energy consuming process. There is therefore a constant need to improve this method in terms of time- and/or energy-consumption and/or in terms of achievable quality of the resulting sugar.

It is therefore the problem of the present invention to provide such an improved method to extract sugar from sugar beets.

SUMMARY

The problem is attained with a method to extract sugar from a sugar beet, wherein the sugar beet is cut in a cutting device in strips/cossettes. Each strip/cossette has a structure with a length and a cross-section, wherein the length of the strips/cossettes is, at least essentially, uniform.

The disclosure regarding this embodiment of the present invention also applies for the other embodiments and vice versa. Embodiments made regarding this embodiment of the present invention can be incorporated in other embodiments of the present invention and vice versa.

This embodiment of the present invention deals with the extraction of sugar from a sugar beet. For the extraction, the sugar beets are cropped and/or cut into strips/cossettes, which are subsequently mixed with water. This mixture is heated and the sugar is extracted from the strips/cossettes into the water and a sugar/water-solution is formed. This process takes place in a tank, diffuser or the like, in which the strips/cossettes are suspended in the heated water sugar solution. Subsequently, after a predetermined residence time, the strips/cossettes are separated from the sugar/water-solution. The extraction is preferably carried out as a continuous process; i.e. strips/cossettes and water are added continuously and the water/sugar-solution and the extracted strips/cossettes are removed continuously. Since the strips/cossettes and the sugar/water-solution is a suspension, the strips/cossettes and the solution must be separated from each other, for example by means of a filter, a centrifuge or the like. The sugar/water-solution is then further concentrated by evaporation of water until the sugar crystalizes. The extracted strips/cossettes can be utilized for example as an energy-source or as animal feed. The filtering of the strips/cossettes from the sugar/water solution is preferably also a continuous process.

The extractor can be operated as a mixed unit or a counterflow- or parallel flow unit. In a counterflow unit, the strips/cossettes and the sugar/water-solution are transported through a vessel as a counter-flow. In a parallel flow operation, the strips/cossettes and the sugar/water-solution are transported through the vessel in the same direction.

According to the invention, the strips/cossettes have at least essentially, preferably entirely, a uniform length. The length of a strip, according to the present invention, is its longest extension.

It has turned out, that this uniform length of the strips/cossettes particularly improves the separation step of the strips/cossettes from the sugar/water-solution, because the tendency of the separation means to clog is reduced.

The length of the strips/cossettes is preferably significantly larger than the dimension of the cross-section. Preferably the shape of the strips/cossettes is longish, for example a longish cylinder or a cuboid, preferably a cuboid with one dimension significantly longer than the other two.

Preferably, the average length of the strips/cossettes is 50-350 millimeters, preferably 80-200 millimeters and particularly preferably 100-150 millimeters. Preferably, the average area of the cross section of the strips/cossettes is less than 30 $mm^2$, preferably less than 30 $mm^2$. The cross-section is area perpendicular to the lengthwise extension of the strip. More preferably, the average area of the cross section is larger than 1 $mm^2$, even more preferably >3 $mm^2$.

According to a preferred embodiment of the present invention, the standard deviation of the length of the strips/cossettes is <50 mm, preferably <30 mm and even more preferably <10 mm.

Preferably, >90% of the strips/cossettes exceed a length of 50 mm, preferably 80 mm, more preferably 100 mm.

The strips/cossettes can be cut off the sugar beets in a direction which is essentially parallel or at an angle, preferably orthogonal, to the length-wise extension of the sugar beet. Preferably, the cutting direction depends on the elasticity of the sugar beet.

The problem is also solved with a method to extract sugar from a sugar beet, wherein the sugar beet is cut in a cutting device in strips/cossettes the sugar beets are fed to the cutting machine in a preselected orientation.

The disclosure regarding this embodiment of the present invention also applies for the other embodiments and vice versa. Embodiments made regarding this embodiment of the present invention can be incorporated in other embodiments of the present invention and vice versa.

According to this preferred or inventive embodiment of the present invention, the sugar beets are all fed to the cutting/cropping-apparatus in the same orientation. Preferably this orientation is maintained during the cutting-/cropping-step. Each sugar beet may be fed to the cutting device such that the cutting- or chopping-direction is parallel to the lengthwise extension of the sugar beet; i.e the axial extension of the cut-off strips/cossettes are parallel to the axial extension of the sugar beet and/or the cutting-direction is parallel to the lengthwise extension of the sugar beet.

Preferably, in a first cutting step, the length-wise extension of each sugar beet is cut into segments, preferably segments with equal length, more preferably such that each segment has the desired length of the strips/cossettes.

The segments are then divided into a multitude of strips/cossettes, for example by chopping or punching or the like.

As already mentioned before, the strips/cossettes are cropped and/or cut-off the sugar beet. However, the skilled person understands that other means or methods to remove strips/cossettes from the sugar beet are also covered by the present disclosure.

Preferably, the sugar beets are grown by artificial cultivation. Artificial cultivation according to the present invention allows the growth of sugar beets under set conditions in terms of light-, nutrient- and/or water-supply. The sugar beets are preferably not grown in soil, but in an artificial medium like wool, preferably cotton wool. An example for artificial cultivation is vertical farming, but the present invention is not limited to this example. With artificial cultivation, for example the shape of the sugar beet and/or its sugar-content and/or the sugar-taste can be influenced.

Artificial cultivation preferably means that the roots of the sugar beets are not placed in soil, but in a watery solution, which preferably also comprises nutrients for the plant. The energy needed for the growth of the plant can be provided artificially, for example via LEDs and/or via sunlight. A combination of both is preferred. During growth, the plants are inspected regularly, preferably automatically, for example by a robot, and in case a special treatment for an individual plant is needed, for example treatment with special nutrients, this is preferably also carried out by the robot.

The sugar beets are preferably grown in an apparatus for cultivation of beet plants, in particular sugar beets, comprising a formative structure with a cavity for containing a growing beet, wherein the formative structure is designed such that the outer shape of the beet is at least partially affected by walls of the cavity during growth.

According to the present invention, it is, thereby, advantageously possible to determine at least partially the outer shape of the grown beet by letting the beet grow up inside the cavity of the formative structure. If the shape of the growing beet is biased into a certain desired shape, so that the shape of the harvested beet follows a predefined form specification, the following processing of the beet can be performed in a more effective way increasing yield and reducing energy consumption. Although the present invention is not limited to vertical farming technologies which means that the apparatus according to the present invention can also be used for improved conventional field cultivation of beet plants, the major advantage is conferred through the apparatus in combination with vertical farming. It is thus possible to increase efficiency of further processing to such an extent that the overall energy balance of vertical farming together with further processing becomes better compared than the energy balance of conventional field cultivation, so that the above-mentioned general challenges and drawbacks of field cultivation can be solved. If, for example, harvested sugar beets have shapes meeting a predefined form specification and are thus more similar in shape and size to each other, further processing steps like transportation of beets, slicing beets into strips/cossettes and diffusing and/or extraction strips/cossettes in water can be implemented much easier and more efficient.

According to the present invention, it is preferred that the cavity is partly or completely filled with a liquid, gaseous and/or vaporous water and/or nutrition solution for soilless cultivation of the beet plant, in particular aeroponic or hydroponic cultivation. Advantageously, the fully-grown beet must not be washed prior to further processing. Alternatively, the cavity is filled with soil for a cultivation in soil.

In the sense of the present invention, the wording “formative” means preferably that the beet contacts at least one wall of the formative element during growing up, so that the outer shape of the growing beet is biased by this wall of the formative element as the wall does not yield. That means the formative structure is designed preferably in such a manner that the size of the cavity is smaller, at least in one directional component, e.g. height or diameter, than a typical beet plant being cultivated outside the cavity till harvesting. Furthermore, the formative structure preferably comprises a base element which is rigid or semi-rigid, so that it can mechanically withstand a typical growth momentum of the growing beet. Preferably, the cavity is designed for containing only one single beet, so that the outer shape of each single beet can be formed individually into the desired form.

In particular, the present invention comprises an apparatus, a plant and a method for artificial cultivation of beet plants which means that at least an artificial light source is used to generate growing. Preferably, a soilless aeroponic or hydroponic artificial cultivation of the beet plants is intended. However, also a cultivation in soil is conceivable as an alternative.

According to the present invention, it is preferred that the formative structure comprises a base element providing the cavity, wherein the base element preferably comprises a cylindrical, conical, cuboid or cubic inner contour, particularly preferably the inner contour is shaped cuboid or cubic with rounded edges. Advantageously, a cavity with a cuboid or cubic inner contour results in a grown beet comprising at least partially a corresponding cuboidal- or cubic-shaped outer form, in particular with rounded edges. Beets formed like that can be transported easier and more efficiently as naturally formed beets because they cannot roll away and be stacked or packed with a much higher packing density.

Apart from that, beets of cuboidal or cubic shape leads to more equal strips/cossettes when being sliced or cut and in particular do not come with too short strips/cossettes which are highly detrimental for certain further processes. Slicing naturally grown sugar beets into strips (cossettes) generally produces not only well-formed strips/cossettes but also a significant number of short strips/cossettes. Suchlike short strips/cossettes adversely affect the countercurrent exchange inside the extractor (also referred to as diffuser) as they tend to clog the sieves in the extraction-/diffusion system. If that happens, the countercurrent exchange must be stopped and the sieves have to be cleaned from clogging short strips/cossettes Naturally grown sugar beets also may result in a reduction of the slicing capacity and/or the cossettes may result in a reduction of the diffusion- and/or extraction-effect due to a higher packing density of the strips/cossettes, for example resulting from short cossettes.

Contrary to that, the cuboidal- or cubic shaped sugar beets resulting from growing up in the apparatus according to the present invention can be sliced or cut into strips/cossettes with a decreased number of so-called short strips/cossettes, so that clogging in the extractor and the other mentioned disadvantages is at least diminished, if not avoided and simultaneously the amount of beet waste during slicing is decreased substantially. The same applies for beets grown up in a cavity with a cylindrical inner contour, as long as the beets are e.g. sliced top-down or vice versa. Alternatively, the beets are sliced crosswise. It is also conceivable that the beets are shredded. Advantageously, the more the edges of the cavity are rounded, the easier is removal of the beet from the cavity for harvesting.

The shaping of the sugar beets increases the efficiency of the cutting process. Artificial growing of the sugar beets further allows to place the sugar beets after harvesting into a preferred orientation, which will be maintained until the sugar beets are cut.

Preferably, the sugar beets resulting from the artificial cultivation have a cuboid- or cylindrical-shape or a disk-shape. Preferably, at least one dimension of the artificially cultivated sugar beet is preferably at least essentially equal to the desired length of the strips/cossettes. The artificially cultivated sugar beet can be cut, for example chopped or punched into a multitude of strips/cossettes.

In case, the sugar beets are grown artificially, preferably no cleaning step of the sugar beets takes place. The sugar beets resulting from artificial growth are not soiled, which improves the energy-transfer to the sugar beets and/or results in cutting rather than severing of the sugar beets. Further or alternatively, the knives used to cut the sugar beets are not have wear.

The strips/cossettes regardless whether grown conventionally or artificially are preferably mixed with water and/or a sugar/water solution. This process step preferably takes place in a separate tank. The strips/cossettes are preferably preheated during this step.

Subsequently, the sugar is extracted from the strips/cossettes and then the strips/cossettes are separated from the water/sugar solution.

DETAILED DESCRIPTION

Figure 1:
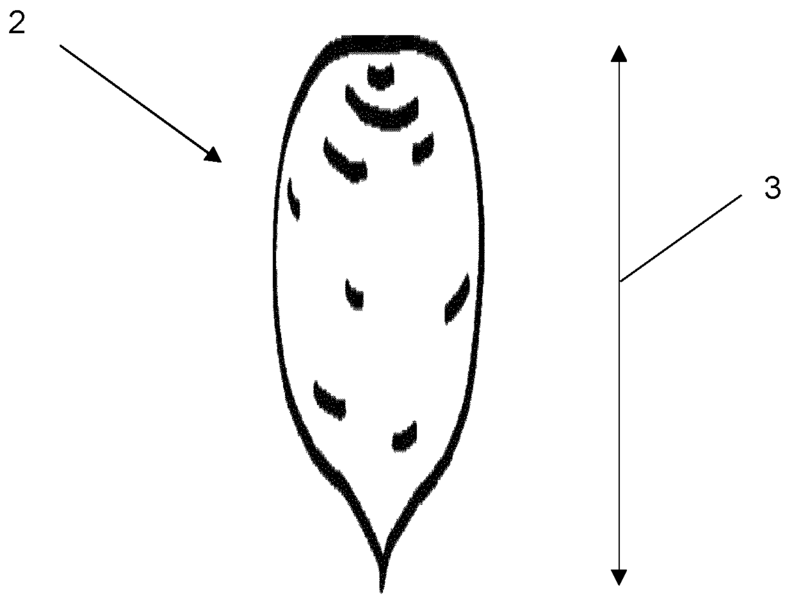
FIG. 1 illustrates a sugar beet-strip/cossette according to the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, a conventionally grown sugar beet 2 is schematically depicted. The sugar beet has an axial extension, which is preferably its longest extension and/or an axis of at least essential symmetry. The sugar beets according to the present invention can also be artificially grown. In this case, the shape of the sugar beet is preferably influenced, if not determined, for example by a special seed and/or by a formative structure, which is designed to affect the outer shape of the sugar beet is at least partially. The formative structure is for example a cavity whose walls delimit the growth of the sugar beet in a certain direction.

The formative structure may comprise a base element providing the cavity, wherein the base element preferably comprises a cylindrical, conical, cuboid, cubic or cubic inner contour, particularly preferably the inner contour is shaped cuboid or cubic with rounded edges.

Figure 2:
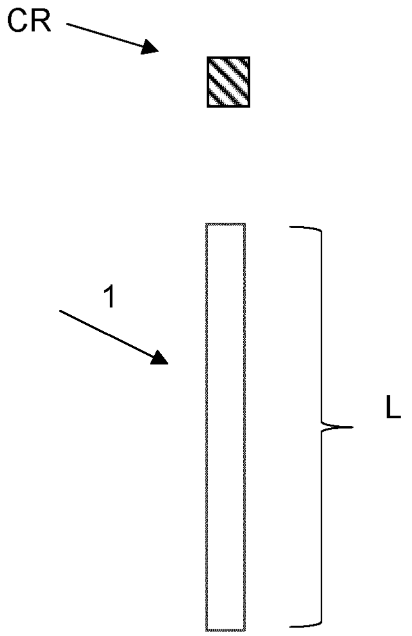
FIG. 2 shows the inventive strips/cossettes.

In order to extract sugar out of the sugar beet, the sugar beet is cut into strips/cossettes, which are depicted in FIG. 2. Each strip/cossette has a length L and a cross section CR. According to the invention, the length of the strips/cossettes is at least essentially uniform. The cross section of the strips/cossettes may have any shape or size, but small cross sections are desirable in order to increase the area of the strips/cossettes.

Figure 3:
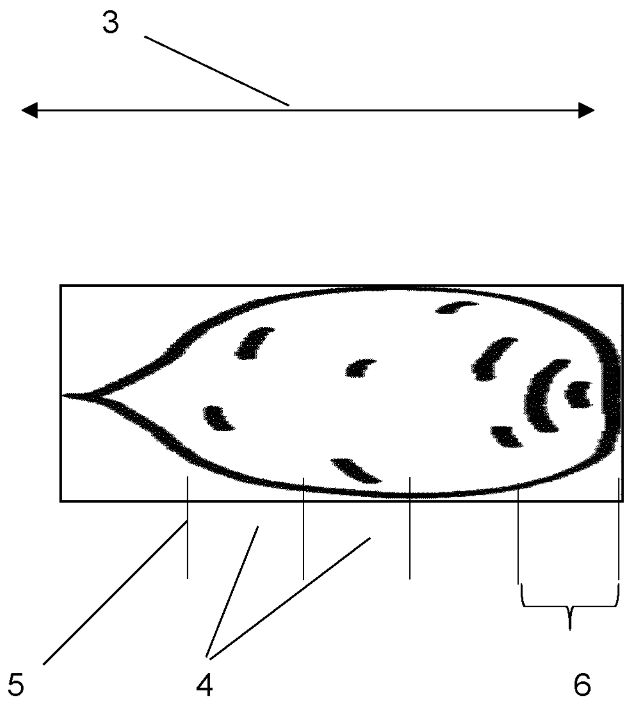
FIGS. 3 and 4 illustrate a method to cut the strips/cossettes

FIG. 3 shows a potential method to process the sugar beets. In the present case, the sugar beets are first cut into axial segments 4, by cuts which are perpendicular to the axial extension of the sugar beets. The cuts 5 can be made simultaneously or sequentially. The resulting sugar beet segments 4 are preferably equal in their length 6. Preferably, the length 6 of the segment is equal to the desired length L of the strips/cossettes.

Figure 4:
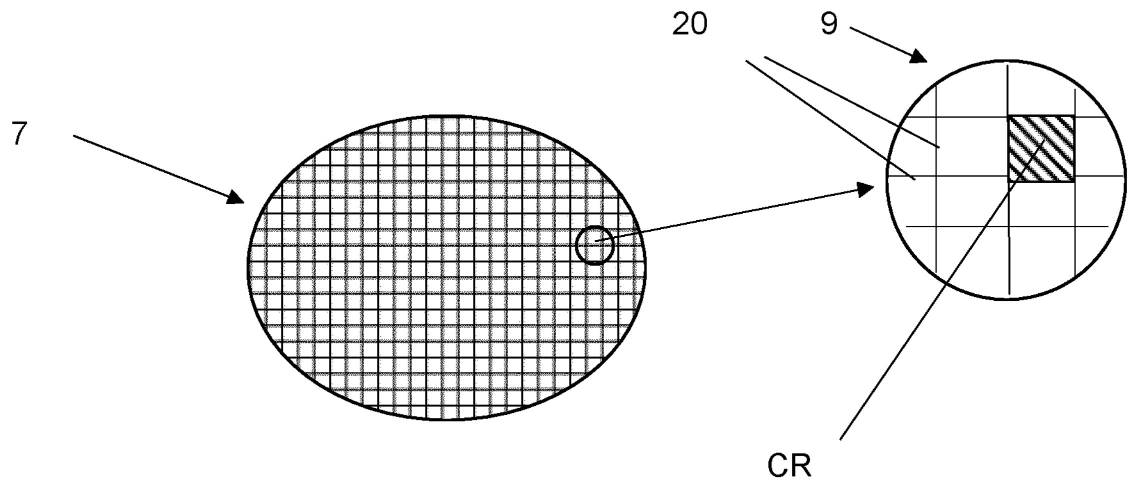

FIG. 4 depict a method to cut the segments into strips/cossettes. In the present case the cutting apparatus comprises a grid of knives 20, which are simultaneously stamped through the cross section 7 of sugar beet segment 4, so strips/cossettes with a cross section CR are formed. The length of the segments is equal to the length 6 of the segment of the sugar beet.

Alternatively, it is also possible to cut off strips/cossettes 1 from the circumference of the sugar beet or the segment 4 of a sugar beet.

Figure 5:
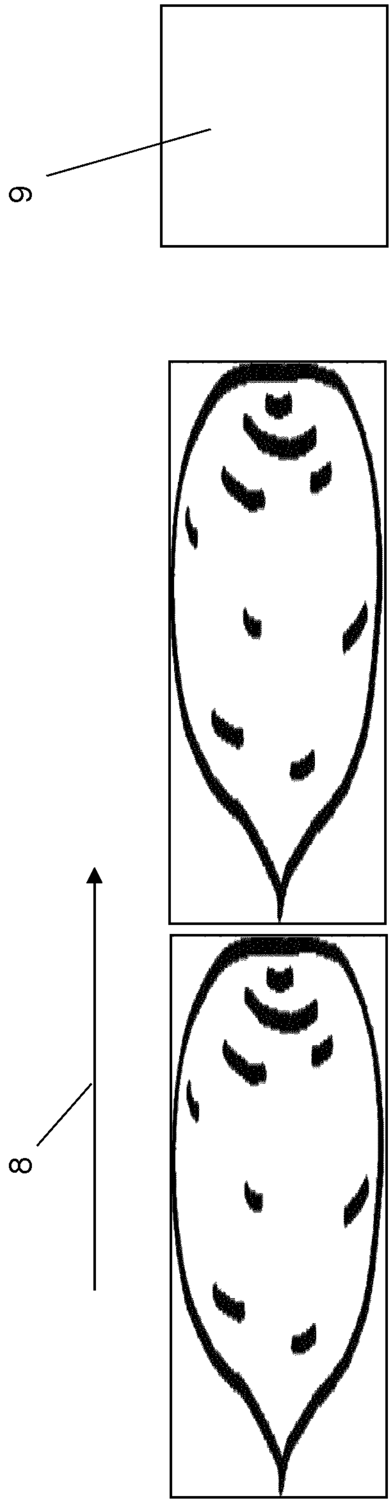
FIGS. 5 and 6 shows the feeding of the sugar beets to the cutting apparatus 9.
Figure 6:
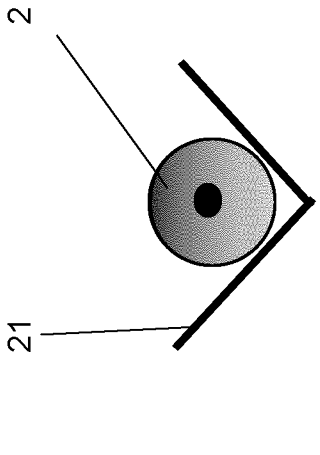

In FIG. 5 a preferred or inventive embodiment of the present invention is depicted. Differently to the state in the art, the sugar beets are not randomly supplied to the cutting apparatus, but in an organized fashion, here in a lengthwise order. This preselected orientation can for example be achieved with a V-shaped transportation belt 21 as depicted in FIG. 6.

The feeding of the sugar beets in a preselected orientation has the advantage that all sugar beets can be cut in the same way which results in a more uniform length L of the resulting strips/cossettes.

Figure 7:
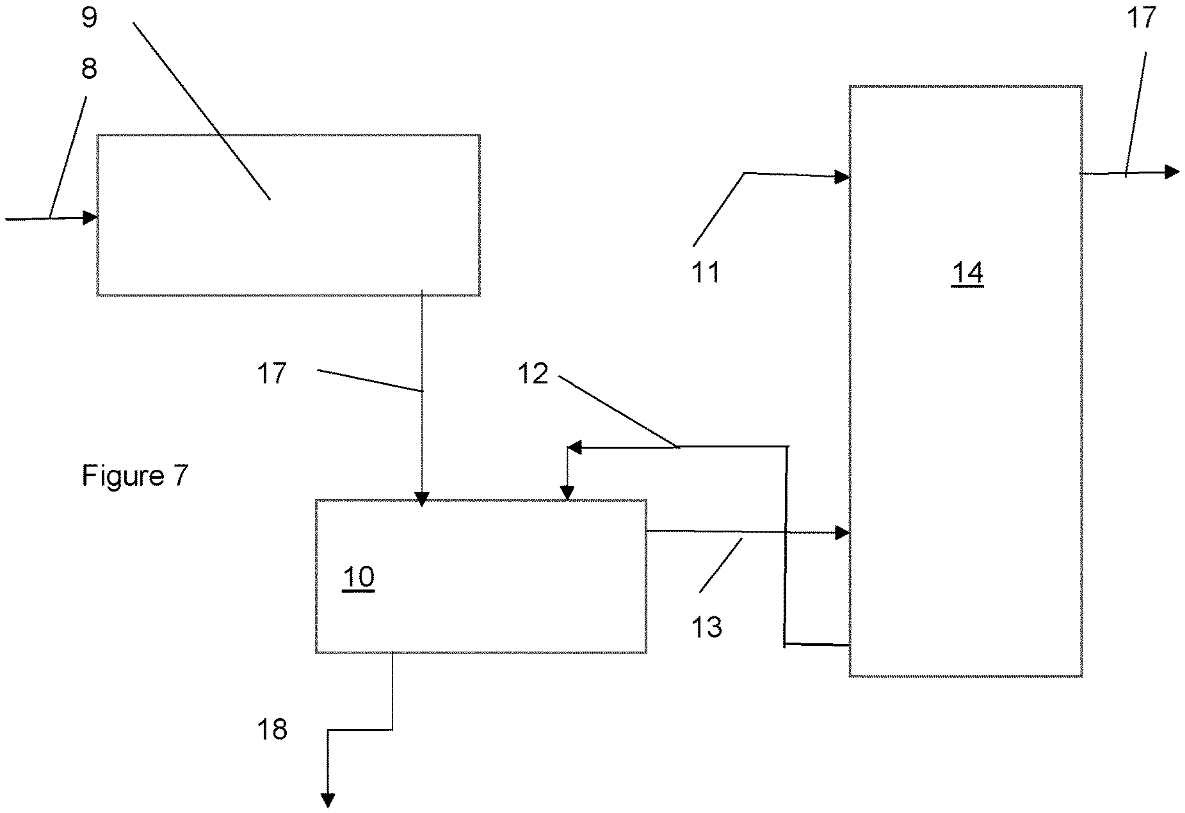
FIG. 7 schematically illustrates the extraction of the sugar from the sugar beets.

In FIG. 7 the sugar extraction process is schematically depicted. The sugar beets are fed to a cutting apparatus 9, preferably in a preselected orientation, in which each sugar beet is cut into strips/cossettes. As indicated by arrow 17, the strips/cossettes are the provided to a mixer 10, in which they are mixed with water or here with a sugar/water-solution 12 coming from the extractor 14. In the mixer 10, the strips/cossettes are pre-heated. The sugar beet strips/water mix are then fed into the extractor 14 as indicated by arrow 13. In the extractor 14, the sugar is extracted from the sugar beets in the presence of water and under the influence of an elevated temperature. The extractor preferably operates continuously, i.e. strips/cossettes 17 and water 11 are pumped continuously into the extraction/diffusion system 14 and extracted strips/cossettes 17 and sugar/water-solution 18 is removed continuously.

The sugar/water-solution is then further cleaned, concentrated and processed in an apparatus 19 until white sugar crystals are gained.

LIST OF REFERENCE SIGNS

1 strip
2 sugar beet
3 axial extension of the sugar beet
4 axial segments
5 cut
6 Length of a segment
7 cross section of the sugar beet along a cut 5
8 sugar beet supply, transportation direction
9 cutting apparatus
10 mixer, pre-heater

11 water-supply

12 recycling-stream

13 sugar/beet strips/cossettes-water mix

14 extractor/diffusion

16 extracted/exhausted sugar beet strips/cossettes

17 sugar beet strips/cossettes

18 sugar/water solution

20 knife, grid of knives

21 transportation belt

CR cross section of the strip

L length of the strip

The invention claimed is:

1. A method to extract sugar from a sugar beet, comprising: cutting the sugar beet in a cutting device into strips/cossettes with a length and a cross-section, wherein the length of the strips/cossettes is uniform, wherein an average length of the strips/cossettes is 80-200 millimeters, a standard deviation of the length of the strips/cossettes is <30 mm, an average area of a cross section of the strips/cossettes is less than 30 $mm^2$ and larger than 1 $mm^2$, and then extracting the sugar from the strips/cossettes.

2. The method according to claim 1, wherein the average length of the strips/cossettes is 100-150 millimeters.

3. The method according to claim 1, wherein the standard deviation of the length of the strips/cossettes is <10 mm.

4. The method according to claim 1, wherein >90% of the strips/cossettes exceed a length of 50 mm, or 80 mm, or 100 mm.

5. The method according to claim 1, wherein the sugar beet is fed to a cutting machine for the cutting step in a preselected orientation.

6. The method according to claim 1, wherein the strips/cossettes are copped-chopped off the sugar beet.

7. The method according to claim 1, wherein the sugar beet is grown by artificial cultivation.

8. The method according to claim 1, wherein the method comprises mixing the strips/cossettes with water.

9. The method according to claim 1, wherein the method comprises no cleaning step of the sugar beet.

10. The method according to claim 1, wherein the method comprises separating the strips/cossettes from a water/sugar solution.

11. The method according to claim 7, wherein the extracting step is carried out continuously such that the strips/cossettes and water are continuously supplied to the extractor and the sugar/water solution and extracted strips/cossettes are continuously removed from the extractor; wherein the sugar beet is grown by artificial cultivation such that a root of the sugar beet is not grown in soil; wherein the sugar beet is not subjected to a cleaning step before being cut into the strips/cossettes; and wherein the sugar beet is grown within a cavity that affects an outer shape of the sugar beet during growth, the cavity comprising a cuboid or cubic inner contour having rounded edges.

12. The method according to claim 7, wherein the sugar beet is grown by artificial cultivation such that a root of the sugar beet is not grown in soil; wherein the sugar beet is not subjected to a cleaning step before being cut into the strips/cossettes; and wherein the sugar beet is grown within a cavity that affects an outer shape of the sugar beet during growth, the cavity comprising a cuboid or cubic inner contour having rounded edges.

13. The method according to claim 1, wherein the cutting device comprises a grid of knives, which are simultaneously stamped through a cross section of the sugar beet to form the strips/cossettes.

14. A method to extract sugar from a sugar beet, comprising:

supplying the sugar beet to a cutting device with a transportation belt;

cutting the sugar beet into strips/cossettes with the cutting device, which comprises a grid of knives, which are simultaneously stamped through a cross section of the sugar beet to form the strips/cossettes, wherein the strips/cossettes have substantially uniform lengths, an average length of the strips/cossettes is 80-200 millimeters, a standard deviation of the length of the strips/cossettes is <30 mm, an average area of a cross section of the strips/cossettes is less than 30 $mm^2$ and larger than 1 $mm^2$;

providing the strips/cossettes to a mixer and mixing the strips/cossettes with water;

pre-heating the strips/cossettes in the mixer;

feeding the strips/cossettes and the water into an extractor;

extracting the sugar from the strips/cossettes in the extractor to form a sugar/water solution in the extractor;

after a predetermined residence time, separating the strips/cossettes from the sugar/water solution with a filter or centrifuge;

wherein the sugar beet is grown by artificial cultivation such that a root of the sugar beet is not grown in soil.

15. The method according to claim 14, wherein the extracting step is carried out continuously such that the strips/cossettes and water are continuously supplied to the extractor and the sugar/water solution and extracted strips/cossettes are continuously removed from the extractor, and wherein the sugar beet is transported to the cutting device while maintaining a preselected orientation of the sugar beet.

16. The method according to claim 14, wherein the transportation belt is V-shaped, and the method comprises concentrating the sugar/water solution by evaporation of the water until the sugar crystalizes.

17. The method according to claim 16, wherein the sugar beet is grown within a cavity that affects an outer shape of the sugar beet during growth, the cavity comprising a cuboid or cubic inner contour having rounded edges.

18. The method according to claim 17, wherein the sugar beet is not subjected to a cleaning step before being cut into the strips/cossettes.

19. The method according to claim 18, wherein the extractor is operated as a counterflow unit such that the strips/cossettes and the sugar/water solution are transported through a vessel in opposite directions.

20. The method according to claim 18, wherein the extractor is operated as a parallel-flow unit such that the strips/cossettes and the sugar/water solution are transported through a vessel in the same direction.

* * * * *